United States Patent [19]

Widmann et al.

[11] Patent Number: 5,084,110

[45] Date of Patent: Jan. 28, 1992

[54] PROCESS FOR PRODUCING A LOW-REFLECTION LUMINOPHORE LAYER

[75] Inventors: Hermann Widmann, Ulm/Donau; Klaus Gerland, Ulm-Gögglingen; Klaus Hoffmann, Seeheim-Jugenheim, all of Fed. Rep. of Germany

[73] Assignee: Licentia Patent-Werwaltungs-GmbH, Frankfurt, Fed. Rep. of Germany

[21] Appl. No.: 675,544

[22] Filed: Mar. 25, 1991

[30] Foreign Application Priority Data

Mar. 28, 1990 [DE] Fed. Rep. of Germany ....... 4009909
Aug. 10, 1990 [DE] Fed. Rep. of Germany ....... 4025373

[51] Int. Cl.$^5$ .......................... B05B 5/00; B05D 1/36
[52] U.S. Cl. ................. 148/13; 148/11.5 A; 427/162; 427/166
[58] Field of Search ............. 148/13, 11.5 A; 427/162, 166

[56] References Cited

U.S. PATENT DOCUMENTS

| | | | |
|---|---|---|---|
| 3,936,545 | 2/1976 | Brill et al. | 427/162 |
| 4,372,987 | 2/1983 | Ganner et al. | 427/162 |
| 4,457,587 | 7/1984 | Katayama et al. | 427/166 |
| 4,470,885 | 9/1984 | Randall, Jr. et al. | 148/13 |
| 4,662,653 | 5/1987 | Greenaway | 427/162 |
| 4,687,683 | 8/1987 | Ishi et al. | 427/162 |
| 4,750,262 | 6/1988 | Mahmoud et al. | 148/11.5 A |
| 4,764,432 | 8/1988 | Kalbitzer | 427/162 |

*Primary Examiner*—Upendra Roy
*Attorney, Agent, or Firm*—McGlew & Tuttle

[57] ABSTRACT

A process is disclosed for producing a low-reflection luminophore layer in which an aluminum-plated metal plate is annealed under vacuum, and the luminophore is sintered onto the surface thus blackened by means of glass solder.

10 Claims, No Drawings

PROCESS FOR PRODUCING A LOW-REFLECTION LUMINOPHORE LAYER

FIELD AND BACKGROUND OF THE INVENTION

The present invention pertains to a process for producing a low-reflection luminophore layer. Applying a luminophore layer to a metallic substrate has already been generally suggested. One field of application of such luminophore layers on metal substrates is the detection of objects, using, e.g., the optical emission of the luminophore layer on irradiation, with UV radiation for identification. Such luminophore layers should have low reflection to ensure the highest possible reliability of identification.

SUMMARY AND OBJECTS OF THE INVENTION

A primary object of the present invention is to provide a process for producing such a low-reflection, well adhering luminophore layer.

According to the invention, a process for producing a low-reflection luminophore layer on a metallic substrate at an elevated temperature is provided. The process includes plating a metal substrate with aluminum to provide a luminophore substrate and blackening the plated substrate by annealing. The luminophore is melted in a layer on the blackened surface of the luminophore substrate by means of a glass solder. The annealing of the aluminum-plated metal substrate plate occurs under vacuum. The aluminum-plated metal substrate is annealed at temperatures between 600° C. and 800° C. and preferably at substantially 700° C. The metallic substrate may be in the form of a metal plate or a metal foil. A metal such as cobalt, copper, manganese, or molybdenum, and especially iron, nickel, cobalt or titanium may be used for the aluminum-plated metal substrate either in a form of a foil or a plate. The luminophore layer is preferably melted in air. The luminophore and a glass solder, mixed in a powder like consistency are fused for forming the luminophore layer.

Luminophore layers produced according to the process described here have a uniform, deep, dark color and very low reflection, and they adhere firmly to the substrate. They can also be used in sensitive measuring devices.

DETAILED DESCRIPTION OF THE PREFERRED EMBODIMENT

The present invention will be explained in greater detail on the basis of the embodiment described below. A metal plate, intended as a luminophore substrate, is aluminum-plated on one surface. This aluminum-plated metal plate, which may also have the thickness of a foil, is annealed under vacuum at ca. 675°–750° C., and especially at ca. 700° C., and the plated surface assumes a deep dark color. Metals, e.g., iron, nickel, titanium, cobalt, copper, manganese, or molybdenum, which can be readily plated with aluminum, are suitable as the substrate. Iron, nickel, cobalt, and titanium proved to be particularly suitable.

The luminophore, mixed with a glass solder powder, is then applied to the blackened surface as uniformly as possible according to any known process. The substrate, covered with the luminophore-glass solder layer, is heated in air so intensely that this mixture will sinter, and the luminophore powder is melted by means of the glass solder. The luminophore layer assumes the black color of the substrate during sintering or melting. The luminophore can now be excited with a small amount of scattered light corresponding to its emission characteristics.

While a specific embodiment of the invention has been shown and described in detail to illustrate the application of the principles of the invention, it will be understood that the invention may be embodied otherwise without departing from such principles.

What is claimed is:

1. A process for producing a low-reflection luminophore layer, comprising: providing a metallic substrate; plating the metallic substrate with aluminum to form a luminophore substrate; blackening the luminophore substrate by annealing; and melting the luminophore at elevated temperatures in a layer on the blackened surface of the luminophore substrate by means of a glass solder.

2. A process according to claim 1, wherein said aluminum-plated metal substrate is annealed under vacuum.

3. A process according to claim 1, wherein said aluminum-plated metal substrate is annealed at temperatures between 600° C. and 800° C.

4. A process according to claim 1, wherein said luminophore layer is melted in air.

5. A process according to claim 1, wherein said luminophore and glass solder are mixed in a powder-like consistency and fused.

6. A process according to claim 1, wherein said aluminum-plated metal substrate is formed of a metal selected from one of cobalt, copper, manganese,, molybdenum, iron, nickel, cobalt and titanium.

7. A process according to claim 1, wherein said metal is selected from the group consisting of iron, nickel, cobalt and titanium.

8. A process according to claim 2, wherein said aluminum-plated metal substrate is annealed at temperatures between 600° C. and 800° C.

9. A process according to claim 3, wherein said aluminum-plated metal substrate is annealed at a temperature of substantially 700° C.

10. A process according to claim 8, wherein said aluminum-plated metal substrate is annealed at a temperature of substantially 700° C.

* * * * *